(No Model.)

B. W. GILLIS.
PRINTER'S TYPE MEASURE.

No. 431,692.  Patented July 8, 1890.

Witnesses:  Inventor
E. C. Duff  B. W. Gillis
H. E. Peck,  per
  Attorney
  O. E. Duff

THE NORRIS PETERS CO., PHOTO-LITHO., WASHINGTON, D. C.

UNITED STATES PATENT OFFICE.

BOSANQUET W. GILLIS, OF WASHINGTON, DISTRICT OF COLUMBIA, ASSIGNOR, BY MESNE ASSIGNMENTS, TO BERIAH WILKINS AND B. W. GILLIS, BOTH OF SAME PLACE.

PRINTER'S TYPE-MEASURE.

SPECIFICATION forming part of Letters Patent No. 431,692, dated July 8, 1890.

Application filed August 9, 1889. Serial No. 320,280. (No model.)

*To all whom it may concern:*

Be it known that I, BOSANQUET W. GILLIS, of Washington, District of Columbia, have invented certain new and useful Improvements in Automatic Type-Measures; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to means or methods of measuring compositors' duplicates.

Heretofore the separate duplicates have been attached to each other by means of paste or some adhesive substance applied to the slug, all the duplicates being attached successively until the whole are formed into what is commonly termed a "string," and the number of ems contained in the string is ascertained by placing on the same a rod or measure having a scale on its surface denoting the number of ems in any given number of lines. This old method is very defective, leading to varied results or measurements when measured at different times and by different persons, thereby leading to disputes between the measurer and compositor and confusion of accounts, and the string is not apt to be smooth and even, and hence an accurate measurement cannot be attained with the rod; and, further, this old method of measuring necessitates several measurements and an extra force of clerical help, and requires extra time of the compositor and in the counting-room.

The object of my invention is to obviate the disadvantages and expense of this old method of measuring and to provide an improved and novel means or method of measuring or ascertaining the number of ems in the duplicates, so that the number of ems can be ascertained at any time at a glance, and necessitating no remeasurements with rods, &c., whereby a great saving for the employer, and also the compositor, is attained.

These objects are accomplished by, and my invention consists in, a certain method and means carried out and consisting of a strip of paper, or the like, on which is printed a scale designating the number of ems contained in a single line of any specified size of type, and from that to any desired number of lines.

In the accompanying drawings, Figures 1 and 2 show the scale-strips, Fig. 1 showing a strip for measuring agate type, and Fig. 2 for minion. Figs. 3 and 4 show these strips when applied to use and when the "dupes" are pasted thereon.

The strips are mucilaged or provided with adhesive material along their outer edges only, and the scale for the peculiar type with which this strip is to be used extends up the center of the strip and reads from the bottom up, this scale beginning at the bottom with the figure 1, printed opposite which is the number of ems of the size of type in which the scale is printed in a single line, and directly above is the figure 2 and the number of ems in the two lines, &c. Opposite each number of lines is printed the number of ems contained in that many lines. At the bottom of each scale is preferably printed the character designating the kind of type for which the scale is to be used, such as agate, minion, &c., as shown in the drawings.

The method of measuring by this system is as follows: The strip containing the measure is placed on a table or reversed "galley," preferably so that the measure will read from the bottom. The paste, mucilage, or other adhesive substance is then neatly spread on each edge of the strip, so that none will get upon the central portion of the strip. A sufficient length of the strip is mucilaged to contain the dupes to be placed thereon. The lower edge of the first dupe is then placed on the straight mark or rule at the foot of the column, (see Figs. 3 or 4,) covering the scale within its length. The pasting is then proceeded with in the same manner as the old method, each succeeding dupe being pasted successively upon the strip so as to cover the blank edges or slugs of the dupes until the last one is reached, from which such portion of the blank paper is removed as will permit the top line of said last dupe to lie flush on the first figure of the scale exposed. This first figure will be counted as the correct measurement, this line being counted in lieu of the blank line at the foot of the string. Thus the number of ems in the duplicates of Fig. 3 is 5,673, as readily seen. The manner of counting double-priced matter is by dividing the duplicate vertically and pasting one piece above the other on the strip, and the same method will serve to ascertain the measurement of price-and-a-half matter, in which one-half of the matter is cut off and placed above.

The manner of pasting the duplicates to the edges of the base or strip leaves the center untouched, and thus obviates any possible change in the length of the same by contraction or expansion, which would result if the moist substance were applied to the whole surface.

It should be observed that great advantages are attained by having the scale read from the bottom upward, as will be understood by those experienced in the art.

The adhesive substance for holding the duplicates may be applied sufficiently long before using to become dry, and rendered serviceable by moistening at the time of using.

In order that the compositor can always be aware not only of the number of ems to his credit, but the equivalent of these in dollars and cents, the amount due for each line is placed opposite the number of ems on that line—for instance, suppose the price per line is one cent—opposite the 24 of the first line the character for one cent will be placed, opposite the 48 of the second line the character for two cents will be placed, and so on, so that the compositor can always tell at a glance the amount in dollars and cents of the work he has done.

The great advantages of this system are obvious, the measurement of the duplicates is always exposed to view, no remeasurements are necessary, no mistakes are possible, and there is a great saving of time, labor, and expense to the employer.

What I claim is—

1. Means for measuring compositors' dupes, consisting of a flexible or paper base or strip having a scale thereon composed of a series of numbers arranged in consecutive order from the bottom upward, and having the numbers of ems (of that size type) contained in that many lines located in proximity to each line-number, said base adapted to have the dupes pasted thereon in consecutive order over said scale, so that each line of print of the dupes will register with a line-number of the scale, as and for the purpose set forth.

2. A device for measuring compositors' dupes, consisting of a base or strip upon which the dupes may be pasted in consecutive order, said base having a scale thereon to indicate the number of lines, the number of ems in that many lines, and the price for that many ems, said scale consisting of numbers arranged in consecutive order from the bottom upward, substantially as described.

3. A paper strip or base having a scale thereon composed of a consecutive series of numbers from the bottom upward to indicate so many lines of printed matter, the number of ems in so many lines being printed opposite each line-number, and the price of so many ems printed opposite each em-number, said paper strip adapted to receive a series of compositors' dupes pasted to the strip over the scale and in consecutive order, substantially as described.

4. Means for measuring compositors' dupes, consisting of an elongated paper base or strip having a scale printed thereon and reading from the bottom upward to indicate the number of ems in any number of lines, said strip having its longitudinal edges only provided with adhesive substance, so that said substance covers the strip for a short distance only from its edges, substantially as described.

In testimony that I claim the foregoing as my own I affix my signature in presence of two witnesses.

BOSANQUET W. GILLIS.

Witnesses:
H. E. PECK,
C. M. WERLE.